(12) United States Patent
Clay et al.

(10) Patent No.: US 10,169,172 B2
(45) Date of Patent: Jan. 1, 2019

(54) PASSIVE DETECTION OF LIVE SYSTEMS DURING CONTROLLER FAILOVER IN DISTRIBUTED ENVIRONMENTS

(71) Applicant: International Business Machines Corporation, Armonk, NY (US)

(72) Inventors: Steven D. Clay, Round Rock, TX (US); Roger L. Cundiff, Jr., Austin, TX (US); Dimitar G. Dimitrov, Austin, TX (US); Federico A. Galarraga, Austin, TX (US); Christopher P. Vignola, Port Jervis, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 14/823,883

(22) Filed: Aug. 11, 2015

(65) Prior Publication Data

US 2017/0046237 A1 Feb. 16, 2017

(51) Int. Cl.
*G06F 11/00* (2006.01)
*G06F 11/20* (2006.01)

(52) U.S. Cl.
CPC ...... *G06F 11/2007* (2013.01); *G06F 2201/85* (2013.01)

(58) Field of Classification Search
CPC ............. G06F 11/0757; G06F 11/2028; G06F 9/4887; G06F 11/2089; G06F 11/2092; G06F 11/2023; G06F 11/2071; G06F 9/5038; H04L 67/145; H04L 67/16
See application file for complete search history.

(56) References Cited

U.S. PATENT DOCUMENTS

| | | | | |
|---|---|---|---|---|
| 6,487,680 B1 * | 11/2002 | Skazinski | ........... | G06F 11/0727 714/23 |
| 6,658,540 B1 * | 12/2003 | Sicola | ................. | G06F 11/2007 707/999.202 |
| 6,745,343 B1 * | 6/2004 | Barenys | ................ | G06F 11/327 714/36 |
| 7,088,710 B1 * | 8/2006 | Johnson | ................. | H04L 12/64 370/357 |
| 7,917,613 B2 | 3/2011 | Letca et al. | | |
| 8,055,735 B2 | 11/2011 | Krishnappa et al. | | |

(Continued)

*Primary Examiner* — Loan L. T. Truong
(74) *Attorney, Agent, or Firm* — Garg Law Firm, PLLC; Joseph Petrokaitis (57) ABSTRACT

For passive detection of live systems during controller failover in a distributed environment, a set of member systems is sorted according to heartbeat periods used by members in the set of member systems. An amount of elapsed time since a failure of a first controller system in the distributed environment is determined. From the sorted set, a first member system is selected due to a first heartbeat period of the first member system being a shortest heartbeat period in all heartbeat periods in the sorted set of member systems. Using a processor and a memory at a second controller system, a timeout period is computed. The timeout period is an amount of time remaining in the first heartbeat period after the amount of elapsed time. The first member system is removed from the sorted set after the timeout period expires and the first member system has not sent a heartbeat.

20 Claims, 5 Drawing Sheets

(56) References Cited

U.S. PATENT DOCUMENTS

| | | | | |
|---|---|---|---|---|
| 8,185,777 B2* | 5/2012 | Davies | G06F 11/1456 | 714/1 |
| 8,301,811 B1* | 10/2012 | Wigmore | G06F 13/12 | 710/15 |
| 8,443,119 B1* | 5/2013 | Limaye | G06F 11/2023 | 710/15 |
| 8,756,453 B2* | 6/2014 | Griffith | H04L 43/04 | 714/4.1 |
| 8,879,471 B2* | 11/2014 | Kneckt | H04W 4/02 | 370/310.2 |
| 10,069,675 B2* | 9/2018 | Dusi | H04L 41/0668 | |
| 2006/0215622 A1* | 9/2006 | Abdel-Kader | H04W 48/14 | 370/338 |
| 2008/0005614 A1* | 1/2008 | Lubbers | G06F 11/2092 | 714/11 |
| 2008/0031210 A1* | 2/2008 | Abhishek | H04W 8/005 | 370/338 |
| 2008/0126885 A1* | 5/2008 | Tangvald | G06F 11/1076 | 714/54 |
| 2009/0109850 A1* | 4/2009 | Li | H04W 72/1242 | 370/235 |
| 2010/0257404 A1* | 10/2010 | Singh | G06F 11/0715 | 714/19 |
| 2012/0059823 A1* | 3/2012 | Barber | G06F 17/30584 | 707/737 |
| 2012/0198441 A1* | 8/2012 | Mahdavi | G06F 9/455 | 718/1 |
| 2013/0067274 A1* | 3/2013 | Huang | G06F 13/12 | 714/6.22 |
| 2013/0124607 A1* | 5/2013 | Griffith | H04L 43/10 | 709/203 |
| 2013/0132946 A1* | 5/2013 | Ma | G06F 11/006 | 718/1 |
| 2013/0151888 A1* | 6/2013 | Bhattiprolu | G06F 11/2007 | 714/6.3 |
| 2013/0194993 A1* | 8/2013 | Choi | H04L 67/14 | 370/311 |
| 2013/0197375 A1* | 8/2013 | Heise | A61B 5/024 | 600/484 |
| 2013/0238676 A1* | 9/2013 | Zha | G06F 17/30557 | 707/827 |
| 2014/0019987 A1* | 1/2014 | Verma | G06F 9/5038 | 718/103 |
| 2014/0164831 A1 | 6/2014 | Merriman et al. | | |
| 2014/0310418 A1* | 10/2014 | Sorenson, III | H04L 67/1002 | 709/226 |
| 2015/0119737 A1* | 4/2015 | Brodnick | A61B 5/04011 | 600/512 |
| 2015/0121100 A1* | 4/2015 | Peng | H04W 52/0229 | 713/320 |
| 2015/0323926 A1* | 11/2015 | Wang | G05B 19/0423 | 700/19 |
| 2016/0164716 A1* | 6/2016 | Dusi | G06F 11/1658 | 370/221 |
| 2016/0179635 A1* | 6/2016 | Kondalsamy | G06F 11/203 | 714/4.12 |
| 2016/0210209 A1* | 7/2016 | Verkaik | G06F 11/2033 | |
| 2016/0224437 A1* | 8/2016 | Nelogal | G06F 11/1469 | |
| 2017/0010874 A1* | 1/2017 | Rosset | H04L 67/1097 | |
| 2017/0032300 A1* | 2/2017 | Eggen | G06Q 10/06313 | |

\* cited by examiner

PASSIVE DETECTION OF LIVE SYSTEMS DURING CONTROLLER FAILOVER IN DISTRIBUTED ENVIRONMENTS

TECHNICAL FIELD

The present invention relates generally to a method, system, and computer program product for managing a distributed data processing environment. More particularly, the present invention relates to a method, system, and computer program product for passive detection of live systems during a controller failover in distributed environments.

BACKGROUND

A distributed data processing environment includes several data processing systems that are configured and operated to share the workload of the data processing environment. A distributed data processing environment employs a hierarchical structure amongst the several data processing systems operating therein. A set of systems, known as member systems, report their status to another system, known as a controller system, above the member systems in the hierarchy.

Many sets of member systems similarly report their status to many corresponding controller systems. A status of a member system indicates to the controller system whether the member system is connected, functional, or operational (collectively referred to hereinafter as "alive") in the distributed data processing environment.

Typically, to send a status, a member system sends a heartbeat message to the corresponding controller system at certain periodicity. If a controller system timely receives a heartbeat message from a member system within the heartbeat period established between the member system and the controller system, the controller system deems the member system to be alive. If the controller system does not receive a heartbeat message from the member system within the heartbeat period established between the member system and the controller system, the controller system deems the member system to be not alive, i.e., disconnected from or inoperative in the distributed data processing environment.

Failover is a process of resuming the operations of a failed or disabled data processing system by another data processing system. Generally, but not necessarily, a failover configuration employs redundant systems, where one system operates as the primary system and performs the expected operations, and a redundant system serves as a failover system to take over the operations from the primary system in case of a failure of the primary system. In some cases, the failover system is a second functioning primary system but is designated as the failover system for a first primary system. The second primary system takes on additional operations of the first primary system in case of a failure of the first primary system.

In some cases, the failover system is not pre-determined. When a primary system fails, another functioning system decides through some algorithm to become the failover system for the failed primary system. This other functioning system takes over for the failed primary system and informs other systems in the distributed data processing environment about its role as the failover system.

In a distributed data processing environment, the controller systems are configured in a failover configuration. In some cases, a controller system has a redundant controller system as a failover controller system. In other cases, an operational controller system takes over for another failed controller system.

SUMMARY

The illustrative embodiments provide a method, system, and computer program product for passive detection of live systems during a controller failover in distributed environments. An embodiment includes a method for passive detection of live systems during controller failover in a distributed data processing environment. The embodiment sorts a set of member systems according to heartbeat periods used by members in the set of member systems. The embodiment determines an amount of elapsed time since a failure of a first controller system in the distributed data processing environment. The embodiment selects, from the sorted set of member systems, a first member system due to a first heartbeat period of the first member system being a shortest heartbeat period in all heartbeat periods in the sorted set of member systems. The embodiment computes, using a processor and a memory at a second controller system, a timeout period, where the timeout period is an amount of time remaining in the first heartbeat period after the amount of elapsed time. The embodiment removes the first member system from the sorted set of member systems after the timeout period expires.

Another embodiment includes a computer usable program product comprising a computer readable storage device including computer usable code for passive detection of live systems during controller failover in a distributed data processing environment.

Another embodiment includes a data processing system for passive detection of live systems during controller failover in a distributed data processing environment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A controller system is also referred to herein as a controller. A member system is also referred to herein as a member. Presently, when a controller that is managing the status of a set of members fails, it is difficult to reestablish the current status of the various members that were reporting to the failed controller. Presently, a new controller, or another system or user, has to actively probe for status from each member that reported to a failed controller.

The illustrative embodiments recognize that such active probing or other comparable overt action for obtaining the statuses from each member of a failed controller is undesirable. For example, collecting or updating the status in this manner consumes computing resources, which can create additional burden on the failover controller that is trying to take over the operations of the failed controller. As another example, such overt or active probing generates overhead traffic in the data network, consuming network bandwidth that can otherwise be directed for productive workload related traffic.

The illustrative embodiments further recognize that a failover mechanism in a distributed data processing environment already includes provisions for a member to seek out an alternate controller in the hierarchy when the member's primary controller fails. Furthermore, such alternate controller need not necessarily be the designated failover controller of the primary controller.

Thus, the illustrative embodiments recognize that not only is the active probing of members expensive, it is also fruitless in many cases. For example, an existing active method of obtaining status from a member may expend the computing resources and generate the traffic overhead only to find out that the member has started reporting to a different controller, and the status of the member is therefore irrelevant to the failover controller because the member will not be reporting to the failover controller anyway.

The illustrative embodiments used to describe the invention generally address and solve the above-described problems and other problems related to managing controller failovers in distributed data processing environments. The illustrative embodiments provide a method, system, and computer program product for passive detection of live systems during a controller failover in distributed environments.

An embodiment executes as an application in, or in conjunction with, a failover controller that is taking over the operations of a failed primary controller. When a primary controller fails, an embodiment in a failover controller identifies the members that were reporting to the failed controller at the time of the failure.

Generally, controllers in a distributed data processing environment exchange member lists with one another from time to time. A member list of a controller identifies each member that was known to be reporting to the controller at the time the controller sends the member list. The embodiment uses the last member list received from the failed controller to identify the members that were reporting to the failed controller prior to the failure.

From the list, the embodiment determines a heartbeat period that is being used by each member in the list. Different members could have been transmitting heartbeat packets to the failed controller at different heartbeat periods.

The embodiment sorts the member list according to the heartbeat periods of the members. One example sorted list places the members in an ascending order of their heartbeat periods.

The embodiment calculates an amount of time that has passed since the failure of the primary controller. The embodiment selects the member that has the shortest heartbeat period in the sorted list. The embodiment subtracts from the selected member's heartbeat period the amount of time that has passed since the failure of the primary controller to determine a timer period.

The embodiment configures a timeout timer to measure the timer period, and activates the timeout timer. When the timer expires, the embodiment determines whether the failover controller has received a heartbeat from the selected member, or any other member on the sorted list.

If the failover controller has not received a heartbeat packet from the selected member, the embodiment concludes that the selected member is disconnected, and removes the selected member from the sorted list. A member may not transmit a heartbeat to the failover controller in two cases. The first case when a member may not transmit a heartbeat is when the member has truly become disconnected and is not reporting to any controller in the distributed data processing environment. The second case when a member may not transmit a heartbeat to the failover controller is when the member has started reporting to a different controller in the distributed data processing environment. In the second case, the failover controller may become aware through existing controller-controller communications that the member is transmitting heartbeats to the other controller and removes the member from the list maintained by the failover controller.

In either case, the status of that member is inconsequential to the failover controller, and the failover controller should no longer track the status of that member. Thus, the removal of that member from the sorted list effectively manages the current status of that member at the failover controller without actively probing the member for current status. Thus, the embodiment passively establishes the current status of the member.

If the failover controller receives the heartbeat of the selected member or of any other member during the timer period, the embodiment passively determines that those heartbeating members are alive and reporting to the failover controller. Again, the embodiment establishes the current status of the heartbeating members without any active probing. The embodiment removes the heartbeating member or members from the sorted list.

The removal of a member from the sorted list reduces the size of the sorted list. The embodiment again calculates an amount of time that has passed since the failure of the primary controller. The embodiment removes all such members from the sorted list whose heartbeat periods are shorter than the amount of time that has passed since the failure. This removal is because the embodiment has either already received such member's heartbeat packet by during an earlier timer period, or the embodiment has not received such member's heartbeat packet; either way the embodiment has established the current status of such member.

The embodiment selects from the remaining sorted list a member that has the shortest heartbeat period in the sorted list that has not elapsed since the failure. The embodiment subtracts from the selected member's heartbeat period the amount of time that has passed since the failure of the primary controller to determine a new timer period.

The embodiment configures the timeout timer to measure the new timer period, and activates the timeout timer. When the timer expires, the embodiment determines whether the failover controller has received a heartbeat from the selected member, or any other member on the sorted list.

The embodiment continues to iteratively remove members from the sorted list in this manner until no members remain in the sorted member list. When the member list is empty, the embodiment has passively established the current status of each member that was reporting to the failed primary controller without actively probing any of those members.

A method of an embodiment described herein, when implemented to execute on a device or data processing system, comprises substantial advancement of the functionality of that device or data processing system for passive detection of live systems during a controller failover in distributed environments. For example, prior-art method of failing over a failed controller requires active request and response for the status of each member that was reporting to the failed controller. An embodiment passively determines the current status of each such member. An embodiment does not require sending any status requests or other transmissions to proactively obtain a member's status. Such manner of passive detection of live systems during a controller failover in distributed environments is unavailable in presently available devices or data processing systems. Thus, a substantial advancement of such devices or data processing systems by executing a method of an embodiment is in reducing the cost of determining the status of a set of members during a failover of a controller.

The illustrative embodiments are described with respect to certain hierarchy, periods, packets, lists, sorting, timers, removal operations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
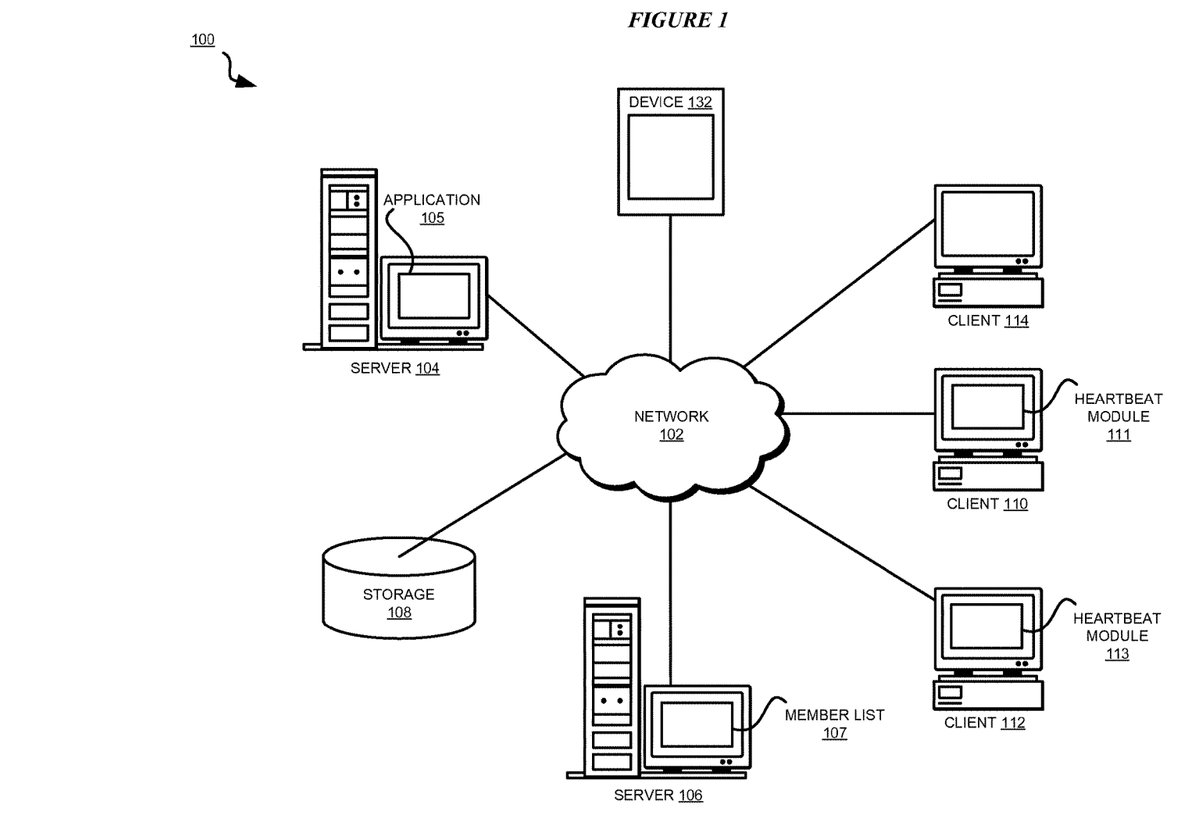
FIG. 1 depicts a block diagram of a network of data processing systems in which illustrative embodiments may be implemented.
Figure 2:
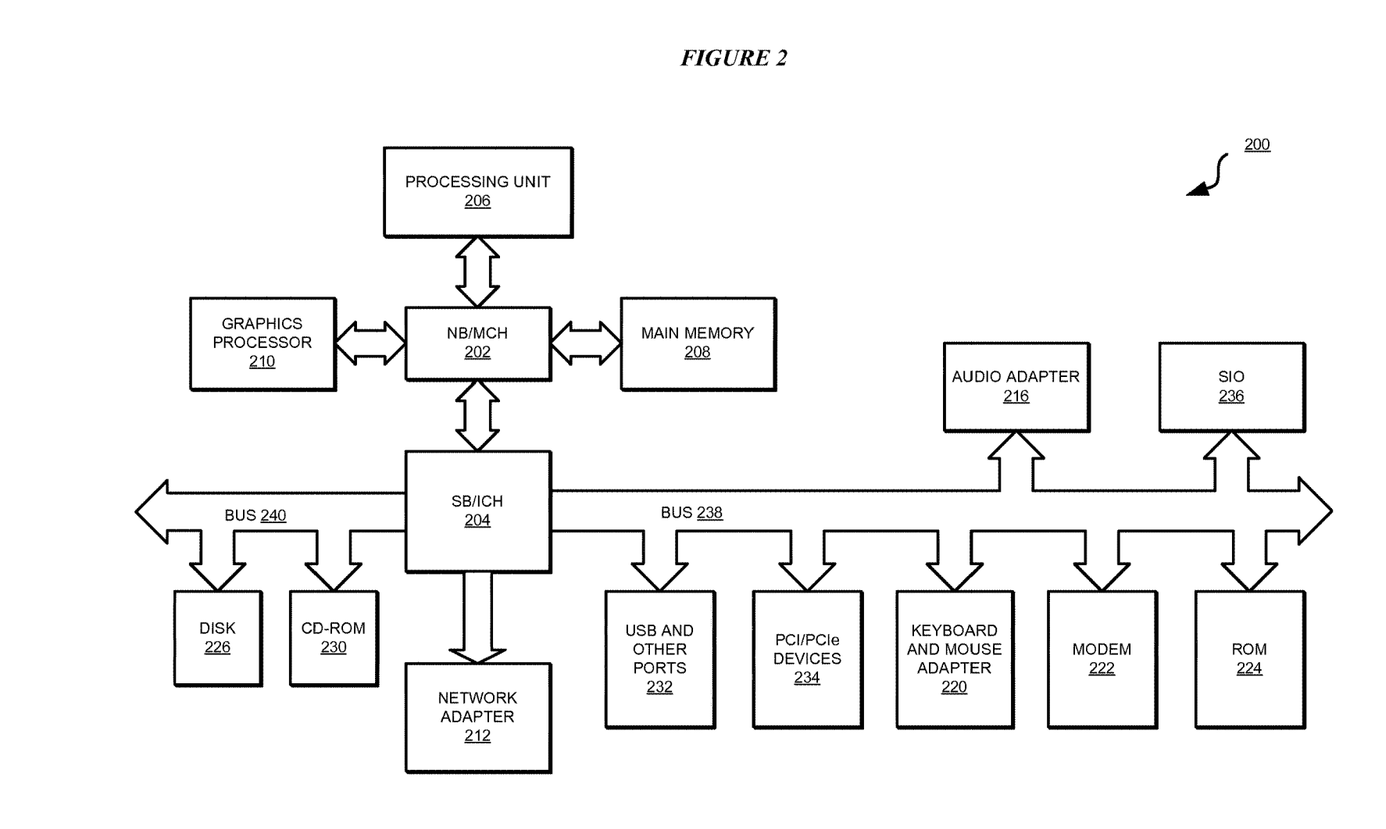
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume as a non-limiting example that server 106 is a primary controller and server 104 is a failover controller for primary controller 106. Application 105 implements an embodiment described herein in failover controller 104. As a non-limiting example, data processing systems 110 and 112 are member systems in distributed data processing environment 100. Member 110 includes heartbeat module 111, which transmits heartbeat packets to a controller, such as to controller 106, in distributed data processing environment 100 at a configured heartbeat period. Similarly, member 112 includes heartbeat module 113, which transmits heartbeat packets to a controller, such as to controller 106, in distributed data processing environment 100 at a configured heartbeat period. Controller 106 maintains member list 107. Member list 107 includes identifiers of members 110 and 112.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
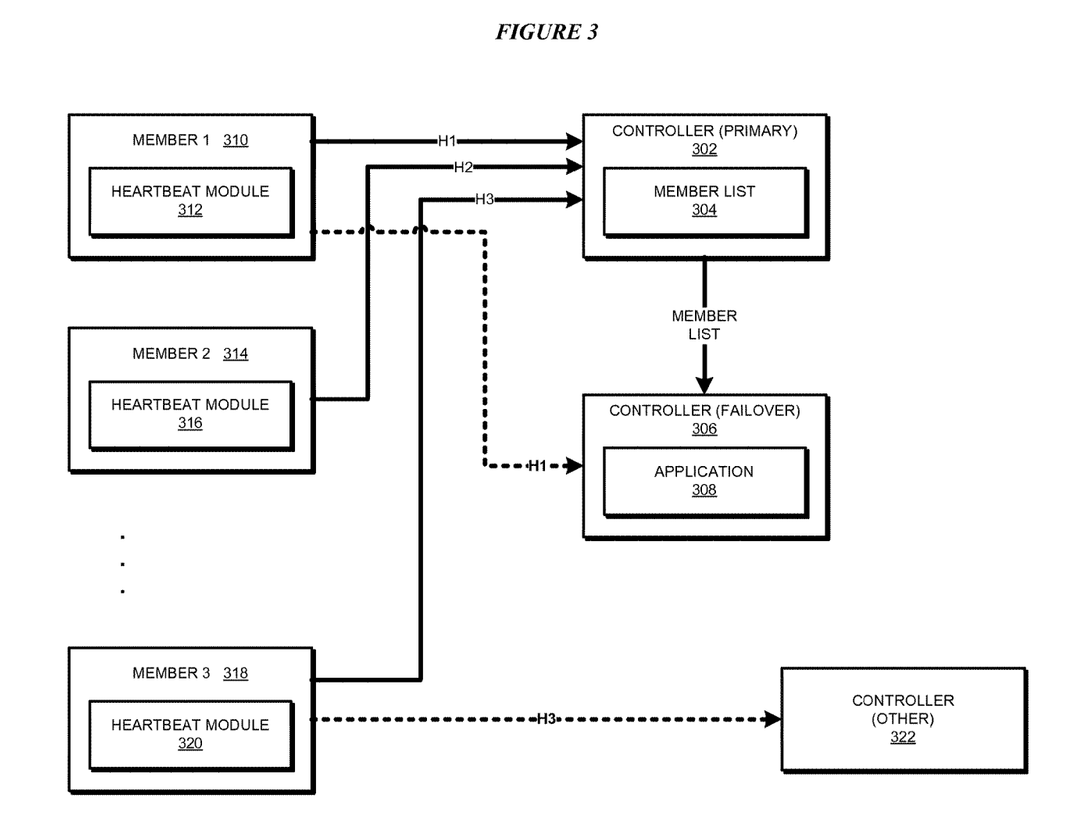
FIG. 3 depicts a block diagram of an example configuration for passive detection of live systems during a controller failover in distributed environments in accordance with an illustrative embodiment.

With reference to FIG. 3, this figure depicts a block diagram of an example configuration for passive detection of live systems during a controller failover in distributed environments in accordance with an illustrative embodiment. Controller 302 is an example of primary controller 106 in FIG. 1. Member list 304 is an example of member list 107 in FIG. 1. Controller 306 is an example of failover controller 104 in FIG. 1. Application 308 is an example of application 105 in FIG. 1. Member nodes 310, 314, and 318, with their corresponding heartbeat modules 312, 316, and 320, respectively, are any number of member systems similar to the configuration of any of members 110 or 112 in FIG. 1.

During normal operation, members 310, 314, and 318 transmit their heartbeats H1, H2, and H3, respectively, to primary controller 302. Member list 304 includes the identifiers of members 310, 314, and 318.

From time to time, controller 302 transmits member list 304 to controller 306, and to potentially any number of other controllers operating in the distributed data processing environment. Usually, member list 304 is transmitted as and when member list 304 changes, and not based on any periodic timer. At some point in time, controller 302 experiences a failure, causing a failover operation to occur in the distributed data processing environment. The failover operation causes controller 306 to take over the controller functions of controller 302.

Application 308 sorts the last received member list from controller 302. Application 308 reduces the sorted member list in the manner described earlier. Only as an example, assume that member 310 timely sends heartbeat H1 to failover controller 306 after the failover. Application 308 deems member 310 to be alive and reporting to failover controller 306 and removes member 310 from the sorted member list.

As another non-limiting example, assume that member 314 does not send any heartbeats H2 after primary controller 302 fails. Application 308 deems member 314 to be disconnected and removes member 314 from the sorted member list.

As another non-limiting example, assume that member 318 begins sending heartbeats H3 to a different controller in the distributed data processing environment—controller 322—after primary controller 302 fails. Application 308 deems member 318 to be disconnected, even though member 318 is actually active, and removes member 318 from the sorted member list. In one embodiment, application 308 may receive information from controller 322 that member 318 is heartbeating to controller 322. Application 308 may remove member 318 from the sorted member list, or mark member 318 in some other way without removing the member from the list so as to indicate that member 318 need not be tracked in the list anymore.

Figure 4:
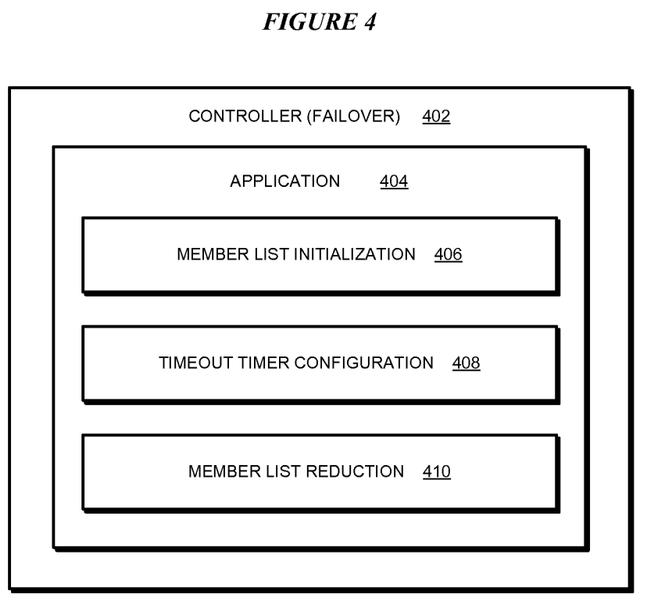
FIG. 4 depicts a block diagram of an application for passive detection of live systems during a controller failover in distributed environments in accordance with an illustrative embodiment.

With reference to FIG. 4, this figure depicts a block diagram of an application for passive detection of live systems during a controller failover in distributed environments in accordance with an illustrative embodiment. Controller system 402 is an example of failover controller 306 in FIG. 3. Application 404 is an example of application 308 in FIG. 3.

Component 406 in application 404 receives member lists from a primary controller, such as member list 304 from primary controller 302 in FIG. 3. During failover, component 406 sorts the members in the member list according to their respective heartbeat periods.

Component 408 configures a timeout timer. Particularly, component 408 determines an amount of time that has passed since the failure of the primary controller, and computes a timer period as described herein. Component 408 activates the timeout timer for the computed timer period. Component 410 reduces the sorted member list produced by component 406 in a manner described herein.

Figure 5:
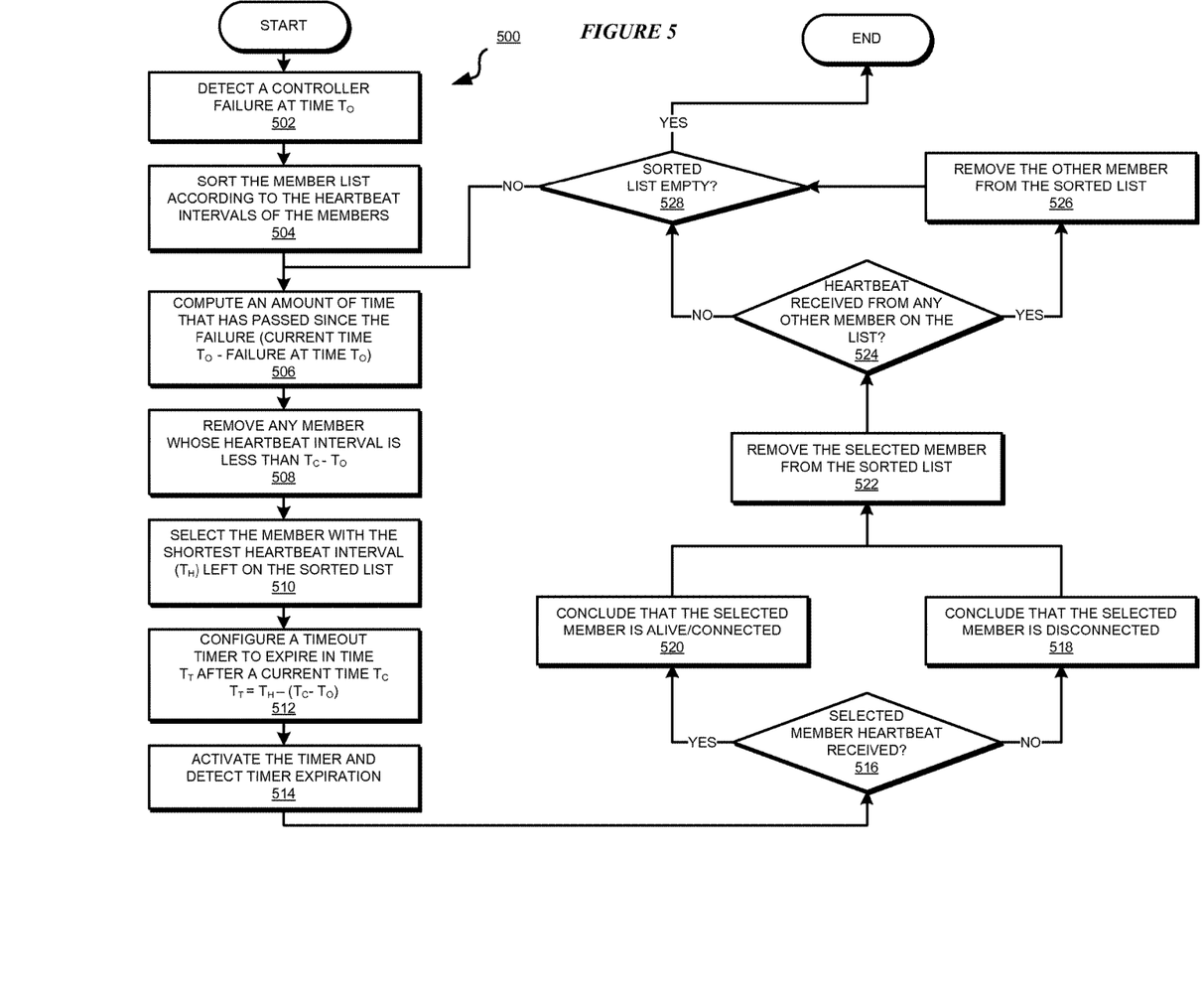
FIG. 5 depicts a flowchart of an example process for passive detection of live systems during a controller failover in distributed environments in accordance with an illustrative embodiment.

With reference to FIG. 5, this figure depicts a flowchart of an example process for passive detection of live systems during a controller failover in distributed environments in accordance with an illustrative embodiment. Process 500 can be implemented in application 404 in FIG. 4.

The application detects a primary controller failure at time $T_0$ (block 502). The application sorts the member list, which was obtained from the failed controller prior to the failure, according to the heartbeat periods or intervals ($T_H$) of the members in the member list (block 504).

Based on a current time $T_C$, the application computes an amount of time that has passed since the failure at time $T_0$ (block 506). This amount of time that has passed since the failure is ($T_C-T_0$). The application removes from the sorted list any member whose $T_H$ is shorter than ($T_C-T_0$) because any heartbeats that were expected from such members should have been received within the period ($T_C-T_0$) (block 508).

From the remaining sorted list, the application selects that member which has the shortest heartbeat period $T_M$ (block 510). The application configures a timeout timer to expire in time $T_T$ after the current time Tc, where $T_T$ is equal to the $T_H$ of the selected member minus ($T_C-T_0$) (block 512). The application activates the timeout timer and detects the timer expiration (block 514).

The application determines whether the heartbeat of the selected member was received during $T_T$ (block 516). If the heartbeat was not received from the selected member ("No" path of block 516), the application concludes that the selected member has been disconnected (block 518). If the heartbeat was received from the selected member ("Yes" path of block 516), the application concludes that the selected member is alive and reporting to the failover controller (block 520). Proceeding from either block 518 or block 520, the application removes the selected member from the sorted member list (block 522).

The application further determines whether any heartbeat was received during $T_T$ from any other member remaining on the sorted list (block 524). If a heartbeat was received from some other member ("Yes" path of block 524), the application deems that member to be active and reporting to the failover controller and removes that member from the sorted list (block 526). If no heartbeat was received from any other member ("No" path of block 524), or after the application removes the other heartbeating member from the sorted list in block 526, the application determines whether the sorted list is empty (block 528).

If the sorted list is not empty ("No" path of block 528), the application returns process 500 to block 506. If the sorted list is empty ("Yes" path of block 524), the application ends process 500 thereafter.

Thus, a computer implemented method, system or apparatus, and computer program product are provided in the illustrative embodiments for passive detection of live systems during a controller failover in distributed environments. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for passive detection of live systems during controller failover in a distributed data processing environment, the method comprising:
    configuring a second controller system as a failover controller in the distributed data processing environment, wherein the distributed data processing environment comprises a first controller system as a primary controller and a set of member systems reporting to the first controller system;
    sorting the set of member systems according to heartbeat periods used by members in the set of member systems;
    determining an amount of elapsed time since a failure of the first controller system in the distributed data processing environment;
    selecting, from the sorted set of member systems, a first member system due to a first heartbeat period of the first member system being a shortest heartbeat period in all heartbeat periods in the sorted set of member systems;
    computing, using a processor and a memory at the second controller system, a timeout period, wherein the timeout period is an amount of time remaining in the first heartbeat period after the amount of elapsed time; and
    removing the first member system from the sorted set of member systems after the timeout period expires.

2. The method of claim 1, further comprising:
    checking whether the second controller system has received a heartbeat packet from the first member system during the timeout period; and
    concluding, responsive to the checking being affirmative, that the first member system is alive and reporting to the second controller system in the distributed data processing environment, wherein the removing is responsive to the concluding.

3. The method of claim 1, further comprising:
    checking whether the second controller system has received a heartbeat packet from the first member system during the timeout period; and
    concluding, responsive to the checking being negative, that the first member system is not reporting to the second controller system in the distributed data processing environment, wherein the removing is responsive to the concluding.

4. The method of claim 1, further comprising:
    checking whether the second controller system has received a heartbeat packet from a second member system during the timeout period;
    concluding, responsive to the checking being affirmative, that the second member system is alive and reporting to the second controller system in the distributed data processing environment; and
    removing the second member system from the sorted set of member systems after the timeout period expires.

5. The method of claim 1, further comprising:
    concluding that a second member system in the sorted set of member systems is not reporting to the second controller system, wherein a second heartbeat period of the second member system is shorter than the amount of elapsed time since the failure of the first controller system; and
    removing from the sorted set of member systems the second member system.

6. The method of claim 5, further comprising:
    further concluding that the second member system has been disconnected in the distributed data processing environment.

7. The method of claim 1, further comprising:
    receiving the set of member systems from the first controller system prior to the failure of the first controller system.

8. The method of claim 1, wherein a second member system in the set of member systems uses a second heartbeat period, and wherein the first heartbeat period is shorter than the second heartbeat period.

9. The method of claim 1, further comprising:
    determining by an operation of a logic that the second controller system will take over operations from the first controller system upon the failure of the first controller system; and
    informing, from the second controller, a third controller system about a role of the second controller system as a failover system of the first controller system.

10. The method of claim 1, wherein the removing comprises marking, without deleting, the first member system from the sorted set of member systems.

11. A computer usable program product comprising a computer readable storage medium including computer usable code for passive detection of live systems during controller failover in a distributed data processing environment, the computer usable code comprising:
    computer usable code for sorting a set of member systems according to heartbeat periods used by members in the set of member systems;
    computer usable code for determining an amount of elapsed time since a failure of a first controller system in the distributed data processing environment;
    computer usable code for selecting, from the sorted set of member systems, a first member system due to a first heartbeat period of the first member system being a shortest heartbeat period in all heartbeat periods in the sorted set of member systems;
    computer usable code for computing, using a processor and a memory at a second controller system, a timeout period, wherein the timeout period is an amount of time remaining in the first heartbeat period after the amount of elapsed time; and
    computer usable code for removing the first member system from the sorted set of member systems after the timeout period expires.

12. The computer usable program product of claim 11, further comprising:

computer usable code for checking whether the second controller system has received a heartbeat packet from the first member system during the timeout period; and computer usable code for concluding, responsive to the checking being affirmative, that the first member system is alive and reporting to the second controller system in the distributed data processing environment, wherein the removing is responsive to the concluding.

13. The computer usable program product of claim 11, further comprising:

computer usable code for checking whether the second controller system has received a heartbeat packet from the first member system during the timeout period; and computer usable code for concluding, responsive to the checking being negative, that the first member system is not reporting to the second controller system in the distributed data processing environment, wherein the removing is responsive to the concluding.

14. The computer usable program product of claim 11, further comprising:

computer usable code for checking whether the second controller system has received a heartbeat packet from a second member system during the timeout period;

computer usable code for concluding, responsive to the checking being affirmative, that the second member system is alive and reporting to the second controller system in the distributed data processing environment; and computer usable code for removing the second member system from the sorted set of member systems after the timeout period expires.

15. The computer usable program product of claim 11, further comprising:

computer usable code for concluding that a second member system in the sorted set of member systems is not reporting to the second controller system, wherein a second heartbeat period of the second member system is shorter than the amount of elapsed time since the failure of the first controller system; and computer usable code for removing from the sorted set of member systems the second member system.

16. The computer usable program product of claim 15, further comprising:

computer usable code for further concluding that the second member system has been disconnected in the distributed data processing environment.

17. The computer usable program product of claim 11, further comprising:

computer usable code for receiving the set of member systems from the first controller system prior to the failure of the first controller system.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A data processing system for passive detection of live systems during controller failover in a distributed data processing environment, the data processing system comprising:

a storage device, wherein the storage device stores computer usable program code; and a processor, wherein the processor executes the computer usable program code, and wherein the computer usable program code comprises:

computer usable code for configuring a second controller system as a failover controller in the distributed data processing environment, wherein the distributed data processing environment comprises a first controller system as a primary controller and a set of member systems reporting to the first controller system;

computer usable code for sorting the set of member systems according to heartbeat periods used by members in the set of member systems;

computer usable code for determining an amount of elapsed time since a failure of the first controller system in the distributed data processing environment;

computer usable code for selecting, from the sorted set of member systems, a first member system due to a first heartbeat period of the first member system being a shortest heartbeat period in all heartbeat periods in the sorted set of member systems;

computer usable code for computing, using a processor and a memory at the second controller system, a timeout period, wherein the timeout period is an amount of time remaining in the first heartbeat period after the amount of elapsed time; and computer usable code for removing the first member system from the sorted set of member systems after the timeout period expires.

* * * * *